(12) United States Patent
Bohanan et al.

(10) Patent No.: US 11,170,752 B1
(45) Date of Patent: Nov. 9, 2021

(54) PHASED ARRAY SPEAKER AND MICROPHONE SYSTEM FOR COCKPIT COMMUNICATION

(71) Applicant: Gulfstream Aerospace Corporation, Savannah, GA (US)

(72) Inventors: Scott Bohanan, Savannah, GA (US); Vincent Dechellis, Savannah, GA (US); Tongan Wang, Savannah, GA (US); Joseph Salamone, Savannah, GA (US); Jim Jordan, Savannah, GA (US); Andrew N. Durrence, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 21 days.

(21) Appl. No.: 15/929,383

(22) Filed: Apr. 29, 2020

(51) Int. Cl.
| | |
|---|---|
| *G10K 11/34* | (2006.01) |
| *H04R 3/00* | (2006.01) |
| *G08G 5/00* | (2006.01) |
| *B64D 43/00* | (2006.01) |
| *H04R 3/12* | (2006.01) |

(52) U.S. Cl.
CPC .......... *G10K 11/346* (2013.01); *B64D 43/00* (2013.01); *G08G 5/0004* (2013.01); *H04R 3/005* (2013.01); *H04R 3/12* (2013.01)

(58) Field of Classification Search
None
See application file for complete search history.

(56) References Cited

U.S. PATENT DOCUMENTS

| | | | | |
|---|---|---|---|---|
| 4,819,269 A * | 4/1989 | Klayman | ................. | H04S 3/00 381/307 |
| 4,866,776 A * | 9/1989 | Kasai | ....................... | H04R 5/02 381/302 |
| 5,838,284 A | 11/1998 | Dougherty | | |
| 7,099,483 B2 * | 8/2006 | Inagaki | .................... | H04R 5/04 381/103 |
| 7,760,889 B2 * | 7/2010 | Form | ................. | B60R 11/0241 381/86 |
| 8,190,438 B1 * | 5/2012 | Nelissen | ................. | H04S 7/30 704/274 |

(Continued)

FOREIGN PATENT DOCUMENTS

CN 109862472 A 6/2019

*Primary Examiner* — Curtis J King
(74) *Attorney, Agent, or Firm* — LKGlobal | Lorenz & Kopf, LLP

(57) ABSTRACT

The pilot communication system employs a transducer array of individual spaced apart speakers and/or microphones for deployment within the cockpit. A signal processing circuit interfaces with the transducer array and also with the aircraft avionics communication system, and selectively applies different time delays to the individual speakers and/or microphones to create in the array an acoustic beam having steerable coverage within the acoustic space of the cockpit. By adjusting the time delays the signal processing circuit directs and focuses sound from the speakers to the pilot and similarly focuses the microphones on the pilot's mouth. In this way the pilots can communicate with each other and with air traffic control without the need to wear headsets. The system also significantly reduces flight deck warnings from being introduced into the cabin environment.

20 Claims, 6 Drawing Sheets

(56) References Cited

U.S. PATENT DOCUMENTS

| | | | | |
|---|---|---|---|---|
| 8,422,693 | B1* | 4/2013 | Daily | H04R 5/02 381/86 |
| 8,615,392 | B1* | 12/2013 | Goodwin | H04R 3/12 704/206 |
| 9,352,701 | B2* | 5/2016 | Vautin | H04R 3/12 |
| 9,953,641 | B2* | 4/2018 | Furukawa | G10L 21/0216 |
| 9,966,059 | B1* | 5/2018 | Ayrapetian | G10L 21/0208 |
| 10,002,478 | B2* | 6/2018 | Van Dyken | H04R 3/005 |
| 10,049,686 | B1* | 8/2018 | Hera | G10L 21/0364 |
| 10,652,663 | B1* | 5/2020 | Burenius | H04R 5/02 |
| 2002/0090093 | A1* | 7/2002 | Fabry | H04S 3/00 381/86 |
| 2003/0063756 | A1* | 4/2003 | Geerlings | H04R 5/02 381/86 |
| 2003/0142835 | A1* | 7/2003 | Enya | H04R 1/403 381/86 |
| 2004/0066940 | A1* | 4/2004 | Amir | G10K 11/17881 381/94.2 |
| 2004/0240676 | A1* | 12/2004 | Hashimoto | H04S 7/305 381/56 |
| 2005/0213786 | A1* | 9/2005 | Kerneis | H04R 5/02 381/302 |
| 2006/0262943 | A1* | 11/2006 | Oxford | H04R 3/005 381/92 |
| 2006/0269074 | A1* | 11/2006 | Oxford | H04R 27/00 381/59 |
| 2007/0025562 | A1* | 2/2007 | Zalewski | H04R 3/005 381/92 |
| 2007/0127736 | A1 | 6/2007 | Christoph | |
| 2007/0135061 | A1* | 6/2007 | Buck | H04M 9/001 455/73 |
| 2007/0211574 | A1* | 9/2007 | Croft, III | H04R 23/00 367/197 |
| 2008/0187156 | A1* | 8/2008 | Yokota | H04R 1/028 381/307 |
| 2008/0212788 | A1* | 9/2008 | Bech | H04S 7/00 381/59 |
| 2010/0104110 | A1* | 4/2010 | Asao | G10K 11/17861 381/71.3 |
| 2010/0128880 | A1* | 5/2010 | Scholz | H04S 5/005 381/17 |
| 2010/0226507 | A1* | 9/2010 | Horibe | H04R 1/406 381/92 |
| 2012/0093338 | A1* | 4/2012 | Levi | H04R 3/005 381/92 |
| 2012/0288124 | A1* | 11/2012 | Fejzo | H04S 7/301 381/303 |
| 2013/0039506 | A1* | 2/2013 | Oide | G10K 11/17873 381/71.6 |
| 2013/0142353 | A1* | 6/2013 | Silzle | H04R 5/023 381/86 |
| 2014/0056431 | A1* | 2/2014 | Kano | H04S 7/30 381/17 |
| 2014/0112496 | A1* | 4/2014 | Murgia | G10L 21/06 381/92 |
| 2014/0136981 | A1* | 5/2014 | Xiang | H04R 3/005 715/728 |
| 2014/0294198 | A1* | 10/2014 | Hall | H04R 3/02 381/93 |
| 2014/0294210 | A1* | 10/2014 | Healey | G06F 3/165 381/302 |
| 2015/0110285 | A1* | 4/2015 | Censo | G10K 11/178 381/71.4 |
| 2015/0124988 | A1* | 5/2015 | Song | G10L 21/0272 381/71.4 |
| 2015/0127338 | A1* | 5/2015 | Reuter | H04R 1/08 704/233 |
| 2015/0127351 | A1* | 5/2015 | Buck | G10L 21/02 704/270 |
| 2015/0210214 | A1* | 7/2015 | Hellaker | H04R 3/12 381/86 |
| 2016/0027428 | A1* | 1/2016 | Gul | B60N 2/879 381/71.4 |
| 2016/0029124 | A1* | 1/2016 | Paranjpe | G10L 21/0232 381/71.14 |
| 2016/0174010 | A1* | 6/2016 | Mohammad | H04M 9/082 381/302 |
| 2016/0183025 | A1* | 6/2016 | Layton | H04R 3/12 381/85 |
| 2016/0219368 | A1* | 7/2016 | Goller | H04R 5/02 |
| 2016/0323668 | A1 | 11/2016 | Abraham et al. | |
| 2016/0379618 | A1* | 12/2016 | Torres | H04R 3/12 381/71.4 |
| 2017/0011753 | A1* | 1/2017 | Herbig | H03G 3/3089 |
| 2017/0142507 | A1* | 5/2017 | Chang | G10K 11/1787 |
| 2017/0150254 | A1* | 5/2017 | Bakish | H04R 1/326 |
| 2017/0213541 | A1* | 7/2017 | MacNeille | G10K 11/17881 |
| 2017/0267138 | A1* | 9/2017 | Subat | B60N 2/885 |
| 2018/0025718 | A1* | 1/2018 | Zukowski | G10K 11/17854 381/71.6 |
| 2018/0167725 | A1 | 6/2018 | Kim et al. | |
| 2018/0242081 | A1* | 8/2018 | Every | H04M 9/082 |
| 2018/0277089 | A1* | 9/2018 | Tonon | G10K 11/17815 |
| 2018/0374469 | A1* | 12/2018 | Hutchinson | G10K 11/17881 |
| 2019/0098408 | A1* | 3/2019 | Bal | H04R 3/12 |
| 2019/0104360 | A1* | 4/2019 | Bou Daher | H04R 3/005 |
| 2019/0359127 | A1* | 11/2019 | Alfano | B60Q 5/005 |
| 2019/0364359 | A1* | 11/2019 | Ferguson | G10L 21/028 |
| 2019/0369615 | A1* | 12/2019 | Martinez Jara | A61B 5/742 |
| 2020/0074978 | A1* | 3/2020 | Maeno | H04R 1/40 |
| 2020/0194023 | A1* | 6/2020 | Tintor | H04R 5/02 |
| 2020/0204464 | A1* | 6/2020 | Watson | H04L 67/025 |
| 2020/0219493 | A1* | 7/2020 | Li | G10L 15/22 |
| 2020/0312344 | A1* | 10/2020 | Hera | G10L 21/0232 |
| 2020/0342846 | A1* | 10/2020 | Cai | H04S 7/304 |
| 2020/0404443 | A1* | 12/2020 | Cardinaux | G06K 9/00832 |
| 2021/0067872 | A1* | 3/2021 | Uchida | G10L 25/78 |
| 2021/0067873 | A1* | 3/2021 | Winton | G10L 21/0216 |
| 2021/0120338 | A1* | 4/2021 | Laury | H04R 7/045 |
| 2021/0204059 | A1* | 7/2021 | Trestain | H04R 3/005 |

* cited by examiner

PHASED ARRAY SPEAKER AND MICROPHONE SYSTEM FOR COCKPIT COMMUNICATION

TECHNICAL FIELD

The disclosure relates generally to two-way communication systems. More particularly, the disclosure relates to a speaker and microphone configuration to allow pilots to communicate with air traffic control towers and other parties.

BACKGROUND

This section provides background information related to the present disclosure which is not necessarily prior art.

The cockpit of an aircraft can be quite a noisy environment. At potentially numerous times throughout the flight the pilot or copilot, seated in this noisy environment, will need to communicate with each other, and to receive and communicate important information by radio with air traffic control (ATC), clearly and accurately so that all parties understand. Currently this has been done through the headset. The headset has the advantage of delivering the air traffic control instructions directly to the pilot's (and copilot's) ears and transmitting the pilot's or copilot's communications back to ATC through a close-talk microphone positioned near the pilot's or copilot's mouth.

Thus traditionally, aircraft pilots and copilots have worn headsets during flight, comprising noise isolating or active noise cancelling headphones to which a boom microphone is attached. Such headsets typically employ a close-talk microphone having a pickup pattern designed to pick up the pilot's voice while rejecting sounds originating from other directions. These have worked well, but there are problems.

One problem with conventional headsets is that they can become uncomfortable to wear, particularly for long periods of time. The ear cups on many headsets apply pressure to the sides of the face and sometimes the ears, which can interfere with blood flow if worn too tightly. The air inside the ear cups also become very warm and stale while wearing, thus pilots sometimes need to remove the headphones to give their ears some fresh air.

Also, because they block out much of the ambient cockpit sound, the pilot and copilot may need to take the headsets off in order to hold conversations with others within the cockpit, such as flight attendants or other personnel, who are not also wearing headphones.

In the conventional aircraft, the headset serves a highly important communication function, but it is not the only system within the aircraft that produces audio sound. Aircraft are also equipped with an alert-signal system, which broadcasts alerts through the flight deck speaker system in all directions. The alert system is necessarily designed to be quite loud, so that it can be heard by pilot and copilot over the ambient noise within the cockpit. However, for business jets, during takeoff and landing, all doors between cockpit and cabin are required to remain open. Thus, these alert signals transmit through the cabin easily, causing unnecessary disturbances to the passengers.

SUMMARY

The disclosed pilot communication system takes a different approach that reduces pilot and copilot reliance on headsets to communicate with each other and with air traffic control (ATC). Using a phased array speaker and microphone system, which can be frequency band segmented for greater clarity, pilots and copilots can easily communicate with each other in the noisy cockpit and can have clear and accurate communications with air traffic control, without the need to wear headsets. The system provides an enhanced signal-to-noise ratio (SNR), so the pilot and copilot can readily hear conversations, ATC communications and alert sounds, without disturbing passengers in the cabin, even when the cockpit-cabin doors are open.

Instead of filling the cockpit with loud communication system audio, sufficient to overcome the ambient noise, the system uses a phased array technique to direct the speaker audio to the pilot's and copilot's ears, and uses a similar phased array technique to focus the microphone pickup pattern directly at the pilot's and copilot's lips. Thus, from the pilot's and copilot's perspective, the received speaker audio sounds are much louder to them than elsewhere in the cockpit or cabin, and their voices are picked up with much less inclusion of ambient noise.

According to one aspect, the disclosed pilot communication system is adapted for use in an aircraft cockpit that defines an acoustic space with at least one pilot seating location disposed therein, and that includes an avionics communication system. The pilot communication system includes a transducer array comprising a plurality of individual acoustic transducers, disposed in a spaced relation to one another and combined for deployment within the cockpit. Each of the plurality of acoustic transducers converts between sound information expressed as an electrical signal and sound information expression as an acoustic wave.

A signal processing circuit has an input port that receives sound information and an output port that supplies sound information after being processed by the signal processing circuit. The input port is configured for coupling to one of: (a) the microphone array and (b) the avionics communication system. The output port is configured to couple to the other of: (a) the speaker array and (b) the avionics communication system.

The signal processing circuit is coupled to the transducer array to electrically interface with each of the plurality of transducers individually. The signal processing circuit selectively inserts a time delay associated with at least some of the plurality of individual transducers to form a coverage beam within the acoustic space of the cockpit. The signal processing circuit selectively controls the time delays associated with the at least some of the plurality of individual transducers to steer the coverage beam in the direction of the pilot seating location.

If desired the sound information can be subdivided into different frequency ranges or bands, which are individually processed by the signal processing circuit. Such frequency subdivision provides more effective steering of the coverage beam.

BRIEF DESCRIPTION OF THE DRAWINGS

The drawings described herein are for illustrative purposes only of selected embodiments and not all possible implementations. Thus, the particular choice of drawings is not intended to limit the scope of the present disclosure.

DETAILED DESCRIPTION

Figure 1:
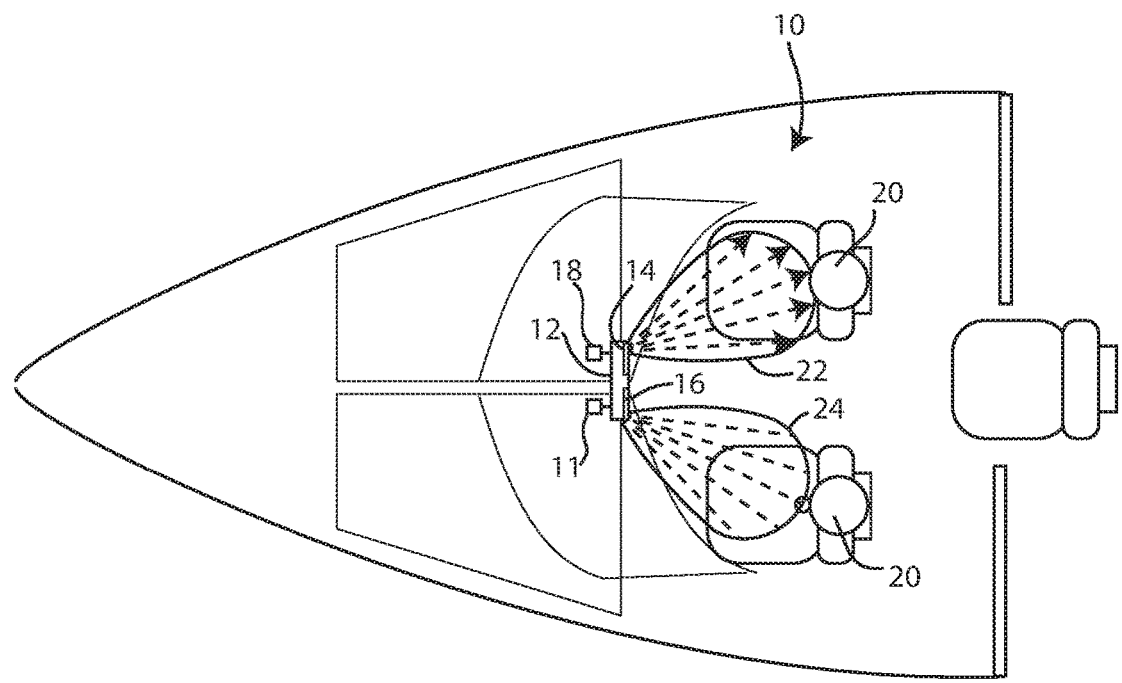
FIG. 1 is a perspective view of the cockpit and flight deck of an exemplary aircraft, showing one possible placement of the pilot communication system (phased array communication system)

Referring to FIG. 1, an exemplary aircraft cockpit and flight deck 10 is illustrated. As illustrated, the pilot communication (phased array communication system) 12 may be located at a suitable position forward of the pilot and copilot seating positions, preferably so that the speaker array 14 and microphone array 16 are within line of sight of the pilot's and copilot's heads. In FIG. 1 the pilot head positions are illustrated at 20. The speaker array 14 defines an acoustic beam 22, in this example directed at one pilot and the microphone array 16 defines an acoustic beam microphone pickup pattern 24, in this example directed at the other pilot. The acoustic beams 22 and 24 are steerable by the signal processing circuit 18, and thus the speaker and microphone beam patterns can be aimed at either (or both) pilot and copilot. Also, while one acoustic beam pattern has been depicted for each of the speaker and microphone arrays, it is possible to control the arrays to define multiple beam patterns from each, by suitably driving these arrays by the signal processing circuit, such as by rapidly switching between different beam directions at a rate that is not discernable to the human ear.

The pilot communication system 12 generally comprises a plurality of speakers and a plurality of microphones (collectively referred to herein as acoustic "transducers") each arranged in a predefined spaced apart layout. In the preferred embodiment these speakers and microphones are coupled to a signal processing circuit 18 that supplies phase-controlled audio signals to the speakers and receives phase-controlled audio signals from the microphones. The signal processing circuit 18 may be implemented using a field programmable gate array (FPGA), microprocessor, a microcontroller, a digital signal processor (DSP), or a combination thereof.

As will be discussed more fully below, the plurality of speakers and plurality of microphones each operate, as a phased array system that produces a beam pattern dictated by the locations of the transducers, and further dictated by the signal time delays to each transducer as governed by the signal processing circuit 18. The pilot communication system may be coupled to the avionics communication system 11, which provides communication with air traffic control (ATC) and also provides signal routing to allow the pilots to communicate with one another and with flight attendants, and to broadcast messages to the passengers.

A typical embodiment of the pilot communication system will include both a speaker array 14, comprising plural speakers, and a microphone array 16, comprising plural microphones. To achieve the desired steerable beam pattern results for both speakers and microphones, the speakers and microphones (collectively "transducers") are physically arranged in a predetermined configuration pattern—a property that bears upon the amount of delay introduced by the signal processing circuit 18.

Several different spaced-apart transducer configuration patterns have been illustrated in FIGS. 2A through 2F. Other configuration patterns are also possible. These configurations patterns may be used singly or in combination. The transducers 26 (speakers or microphones, as noted above) are each arranged according to a predefined configuration pattern, such as but not limited to, those examples shown in FIGS. 2A-2F. Note that it is not necessary for both speakers and microphones be arranged according to the same configuration pattern. Thus, for example, the speakers could be arranged in a spiral configuration pattern, while the microphones are arranged in a square configuration pattern.

Figure 2A:
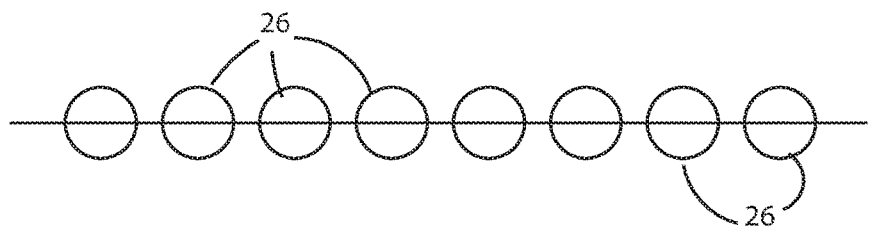
FIGS. 2A-2F are plan views of some different speaker-microphone placement embodiments usable with the pilot communication system.

FIG. 2A illustrates a linear array, where the transducers are centered along a common straight line. The transducers are spaced apart according to a predefined spacing pattern (e.g., equally spaced, logarithmically spaced, or with other spacing) and each is preferably fed by a dedicated audio signal transmission line coupled to the signal processing circuit. In this way, the signal processing circuit is able to send or receive a precisely timed audio signal to each transducer. The effect of such precisely timed audio signals is to produce an array beam pattern.

In the case of the linear array shown in FIG. 2A, the beam pattern can be controlled by the signal processing circuit to provide one-dimensional beam steering. Thus, the linear array is well suited for deployment in flight deck locations where the linear array lies generally in a plane the includes the pilot's and copilot's heads.

Figure 2B:
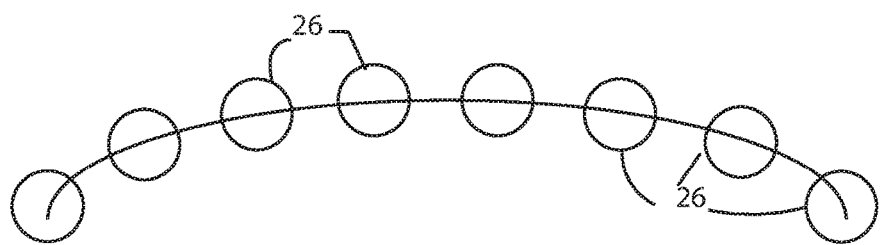

FIG. 2B illustrates a curved or curvilinear array, where the transducers are centered along a common curved line. As with the linear array of FIG. 2A, the transducers may be equally spaced apart, or spaced apart with bilateral symmetry. The curvilinear array is well suited for deployment in portions of the cockpit having naturally curved surfaces, as dictated by the shape of the fuselage. As with the linear array, the transducers of the curvilinear array may be fed by a dedicated audio signal transmission line coupled to the signal processing circuit.

Figure 2C:
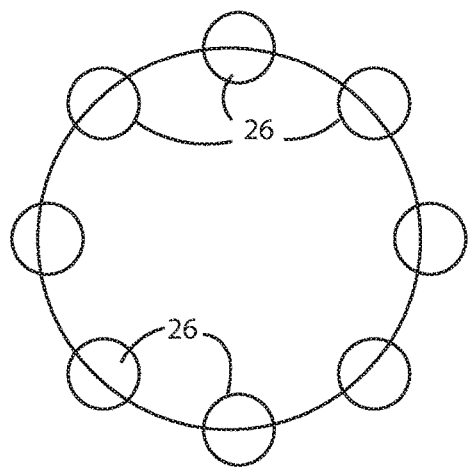

FIG. 2C illustrates a circular array. The transducers are preferably equally spaced, each fed by a dedicated audio signal transmission line coupled to the signal processing circuit. The circular array is well suited for placement on the ceiling of the cockpit, such as above and forward of the pilots heads. The circular array can provide two-dimensional beam steering.

Figure 2F:
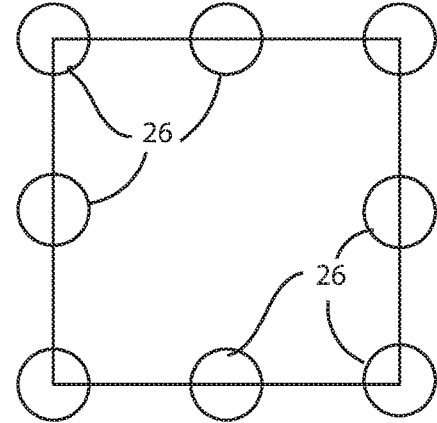
Figure 2D:
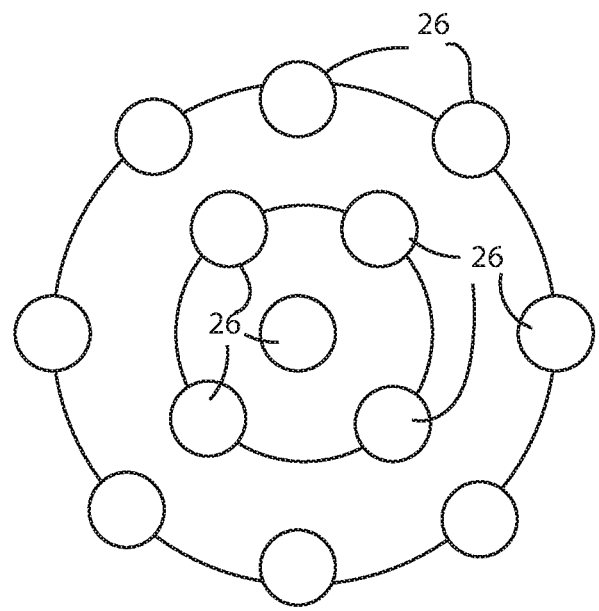

FIG. 2D illustrates a concentric circular array. The transducers are preferably equally spaced around each concentric circle, each fed by a dedicated audio signal transmission line coupled to the signal processing circuit. The concentric circular array is useful where the audio signals being handled by the signal processing circuit are subdivided into different frequency bands. In this regard, lower frequencies have longer wavelengths; conversely higher frequencies have shorter wavelengths. Thus, the concentric circles are sized so that the spacing of the transducers are farther apart on the larger circles (better adapted to collectively reproduce or capture lower frequencies), and closer together on the smaller circles (better adapted to collectively reproduce or capture higher frequencies).

Figure 2E:
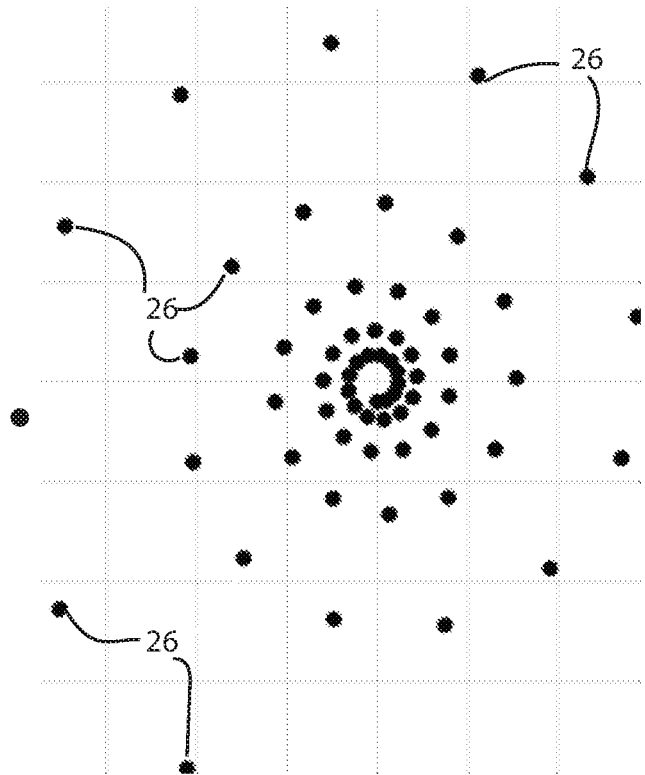

FIG. 2E illustrates a spiral array where the transducers 26 are spaced according to a logarithmic pattern. The transducers are each fed by a dedicated audio signal transmission line coupled to the signal processing circuit. Like the concentric circular array, the spiral array provides different transducer spacings. This is a natural consequence of following a spiral pattern; however, in addition, the individual transducers are spaced apart based on a logarithmic relationship. The spiral array is thus well adapted to provide range of different transducer spacings to correspond with the different frequency bands mediated by the signal processing circuit. In this regard, the spiral array can provide more broadband frequency response, because the signal processing circuit has more transducer spacing options to work with when sending or receiving audio to selected transducers. Like the circular arrays, the spiral array is able to provide two-dimensional beam steering.

FIG. 2F illustrates a square or rectilinear array. The transducers are each fed by a dedicated audio signal transmission line coupled to the signal processing circuit. The square array is similar to the circular array, providing two-dimensional beam steering. The square array is suited in applications where packaging constraints dictate.

While the transducer spacings shown in FIG. 2A-2D are uniform, in practice, the spacing between the transducers could be constant, linear, logarithmic or based on other factors.

Active Transducer Option

In all of the illustrated transducer configuration pattern embodiments, if desired, the transducers may be implemented as addressable active devices, each having a unique address. In such embodiment all transducers may be coupled to the signal processing circuit via a control bus that supplies a data signal carrying the audio information and that carries an address signal used to notify which transducer shall act upon the supplied data signal.

Figure 3:
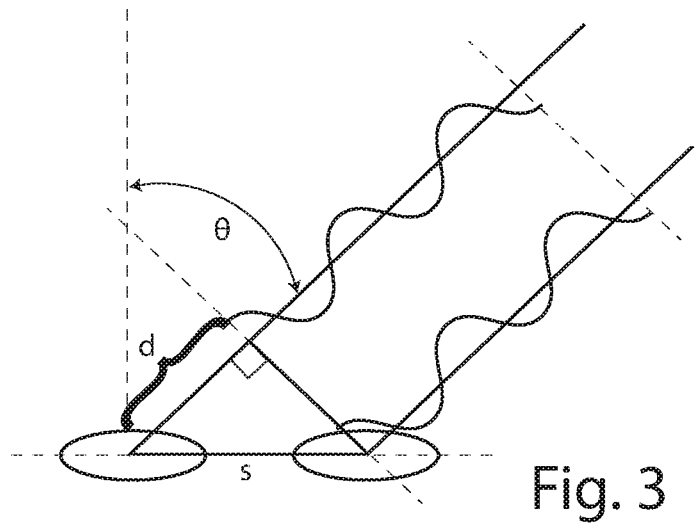
FIG. 3 is diagram illustrating how an inserted time delay is used to direct speaker and microphone beam patterns in the pilot communication system.

To better understand how beam steering is accomplished, refer to FIG. 3, which illustrates two transducers (e.g., speakers) arranged in a linear array. When both speakers are fed coherently with the same sinusoidal audio signal, the sound waves emanating from each speaker are in phase and the sound will appear to come straight on from the plane of the speakers, i.e., from a direction perpendicular to the horizontal axis (as seen in FIG. 3).

However, when one of the speakers is fed by a signal that is delayed by a time increment dt, constructive and destructive interference between the respective wavefronts of the two speakers will produce the loudest collective sound in an angled direction, no longer perpendicular but at an angle θ to the horizontal axis, as shown in FIG. 3. The angled direction can be computed trigonometrically, by knowing the wavelength of the audio frequency. Frequency (f) and wavelength (λ) are related the speed of sound (c), according to the following equation:

$$f=c/\lambda$$

To steer the beam in the direction (angle θ) illustrated in FIG. 3, the signal from speaker on the left (in FIG. 3) is delayed by a time dt computed to account for the fact that the signal from speaker on the left (in FIG. 3) must traverse the additional distance d, in order for its wavefront to be in phase with the wavefront from the speaker on the right (in FIG. 3). This delay dt can be computed for a given angle θ using the following trigonometric relationship:

$$\text{Delay } dt=s\sin(\theta)/c$$

where s is the speaker separation and c is the speed of sound at the ambient temperature.

Comment about Transducer Spacing for Optimum Performance

When designing the spacing between transducers, it is recommended to choose a spacing that avoids formation of strong grating lobes or side lobes. Grating lobes are a consequence of having large and uniform distances between the individual transducer elements in relation to the acoustic wavelength. Therefore, preferably small spacing (relative to acoustic wavelength) should be chosen, so that grating lobes are minimized.

In addition, when designing a phased array communication system for the pilot communication system, it can be beneficial to implement the spaced-apart speakers and the spaced-apart microphones in a common package, so that the speakers and microphones are closely spaced to one another in relation to the acoustic wavelength. This can help minimize acoustic echo, a form of circular feedback where sounds from the speakers are picked up by the microphones and rebroadcast by the speakers. Active electronic acoustic echo cancellation processing can also be included in the signal processing circuit to reduce acoustic echo. Acoustic echo is also reduced because the speakers and microphones operate with steerable beam patterns (beam forming), so that sounds broadcast by the speaker array and sounds picked up by the microphone array can each be focused on different regions of space, thus eliminating conditions for a feedback loop.

Focused, Electronically Steerable Beam Pattern

The phased array technique produces a beam pattern that can concentrate the acoustic signal into a much smaller region of space than is normally produced by a single transducer. Moreover, a phased array of transducers can focus the acoustic signal on a particular region of space by electronically adjusting the phase shift applied to each transducer.

Figure 4:
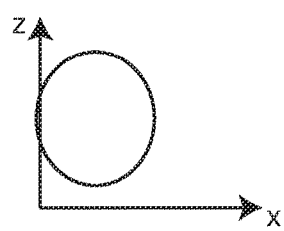
FIGS. 4A and 4B are graphs showing, respectively, the azimuth and elevation views of a single acoustic transducer (not phased array)
Figure 4B:
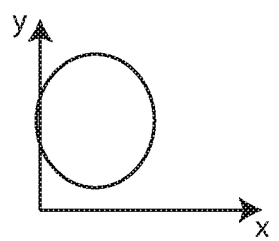

For comparison, FIGS. 4A and 4B show an exemplary sound pressure pattern for an individual transducer operated at a frequency in the nominal range of the human voiced speech, e.g., 500 Hz. Note the pattern is essentially the same in azimuth and elevation and has a wide dispersal pattern. Because this pattern is generated by a single transducer, there is no phased-array beam pattern. The pattern is largely hemispherical or cardioid in shape, with little gain in any direction. At high frequency when the transducer dimension is larger than the acoustic wavelength, single acoustic transducer does exhibit a non-uniform directivity pattern. However, the directivity is not as focused and adjustable as a phased array system.

Figure 5A:
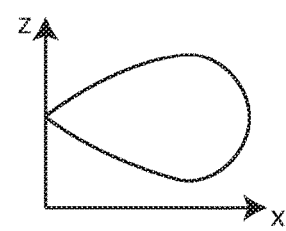
FIGS. 5A and 5B are graphs showing, respectively, the azimuth and elevation views of plural acoustic transducers in a phased array configuration.
Figure 5B:
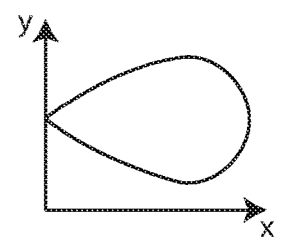

FIGS. 5A and 5B show the comparable sound pressure pattern for an array of transducers operated at the same frequency as FIGS. 4A an 4B. Note the pattern in both azimuth and elevation is significantly focused. The same amount of energy that produced the pattern of FIGS. 4A and 4B is confined to a much narrower beam pattern in FIGS. 5A and 5B, thus producing a much higher sound pressure level along the beam's axis (higher gain) and lower sound energy in other directions. By using a narrower beam pattern that is steerable, the disclosed communication system is able to minimize the sound energy transmitted into the passenger cabin.

Figure 6:
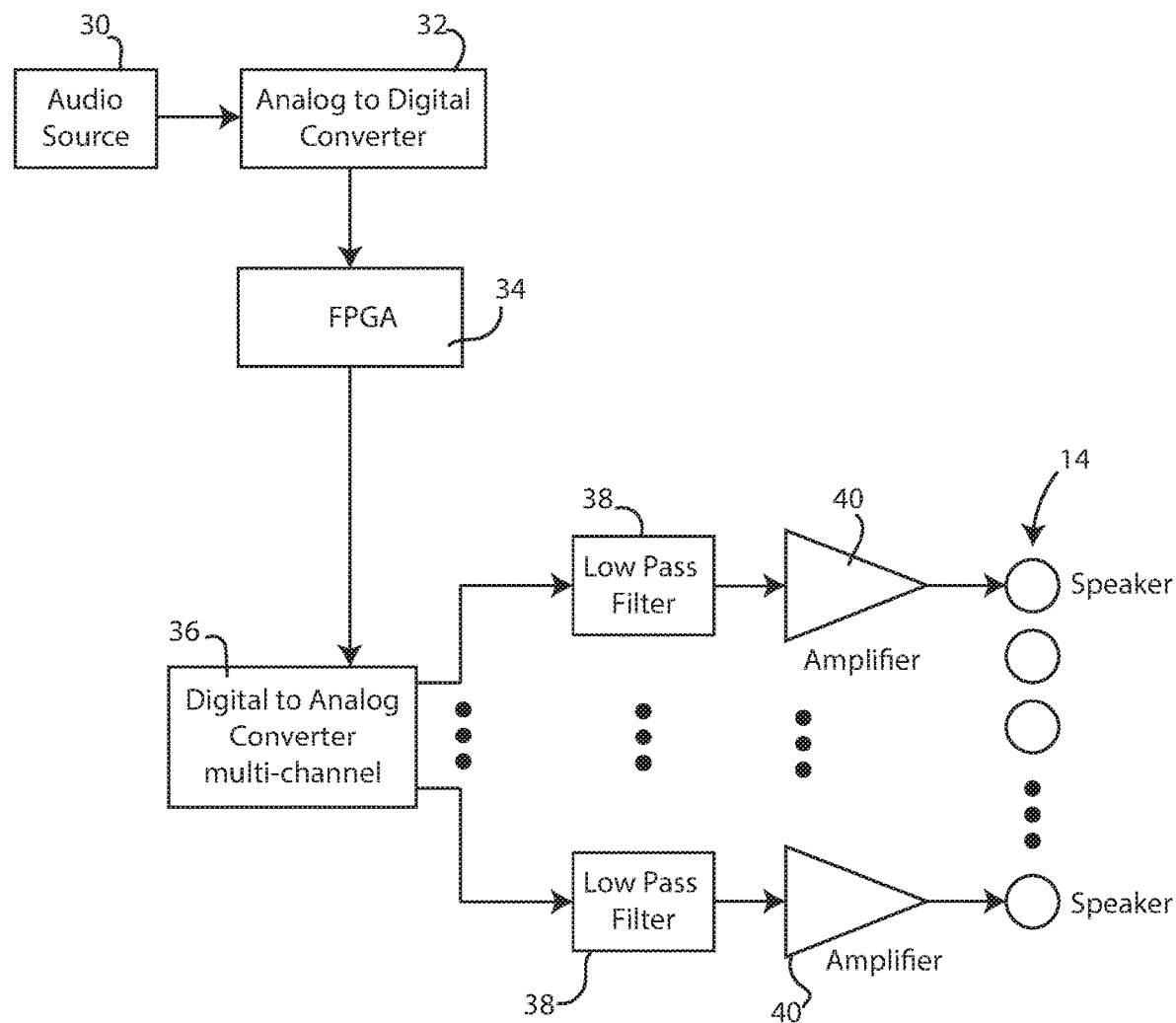
FIG. 6 is a circuit diagram of a single frequency band, signal processing circuit.

FIG. 6 illustrates an exemplary signal processing circuit 18 that may be used to process the audio content broadcast by the speaker transducers. This embodiment treats the audio content as a single band of frequencies. It is thus well suited for speaker arrays arranged as a linear array (FIG. 2A) and may also be effectively used with the curvilinear array (FIG. 2B) and the circular array (FIG. 2C). The audio source 30 can supply audio from a number of sources, including the avionics communication system 11 (FIG. 1), which typically includes a communication radio (e.g., for air traffic control), a sound mixing and routing system used for inter-cabin and cockpit communication (e.g., between pilot and copilot, or with flight attendants and passengers), and audio from the alerting system.

For purposes of illustration, it is assumed that the audio source 30 carries analog audio signals, which are then digitized by the analog to digital (ADC) circuit 32. For illustration purposes an ADC having 16-bit resolution is depicted. Other resolution bit depths are also possible. The ADC supplies the digitized audio signals to a field programmable gate array (FPGA) 34, which is configured by programming to define n-signal paths, to accommodate n-copies of the digital audio stream, where n is the number of speakers implemented in the array. Thus, if an eight-speaker array is implemented, the FPGA will have eight digital audio streams (channels). To each audio stream the FPGA applies a calculated delay time (which could be a null or zero-delay time), collectively designed to steer the collective beam emanating from the speaker array in a particular direction. Details of these delay calculations are discussed below. As noted above, the functions performed by the disclosed FPGA can also be performed using one or more microprocessors, microcontrollers, digital signal processors (DSP), application integrated circuits, and/or combinations thereof.

Once a delay time (which could be a zero-delay time) has been applied to each audio stream individually, the FPGA outputs the digital audio streams to a multi-channel digital to analog convertor (DAC) 36, which converts each digital audio stream into an analog signal. In the illustrated embodiment the multi-channel DAC provides 16-bit resolution to match the resolution of the ADC. Other resolution bit depths are also possible. The multi-channel DAC provides a number of independent channels sufficient to individually process each of the digital audio streams.

Once converted to analog signals, the audio streams are processed by a bank of low pass filters 38. The low pass filter bank 38 includes one low pass filter dedicated to each of the analog audio streams (i.e., one for each speaker in the array). In the illustrated embodiment each filter provides a 3 db roll-off at 100 kHz. The filter allows the audio signals within the human hearing range to pass without attenuation, but blocks frequencies well above that range, to prevent digital clock noise and other spurious signals from being delivered to the amplifier stage 40. Other filter roll-off frequencies and filter slopes are also possible. The amplifier stage 40 provides one channel of amplification for each of the audio signals. Each amplifier provides low distortion signal gain and impedance matching to the speaker 14, so that suitable listening levels within the cockpit can be achieved. If desired, portions or all of the multi-channel components downstream of the FPGA 34 can be bundled or packaged with each speaker, thus allowing digital audio to be distributed to the speaker array. In such an embodiment a sync signal is used to load all of the DACs at the exact same time. Such sync signal is in addition to the digital audio signals provided by existing digital audio standards.

Because the system calculates steering to an actual point in space, rather than just having the array go to an angle, the time delays calculated by the signal processing circuit can be based solely on the distance from each speaker (or microphone) to the defined steer point and the speed of sound. In this regard, frequency subdivision helps in the off-axis behavior. Having uniformly spaced speakers/microphones transmitting the same signal will produce different constructive/deconstructive interference patterns as a function of frequency. The higher the frequency, the narrower the primary node becomes, at the expense of significantly more adverse anti-nodes. This means that small changes in position generate large amplitude variation. This can be seen as a major annoyance and distraction for the flight crews. The frequency subdivision technique uses the difference in speaker/microphone position, coupled with the relative filtering, to maintain the same beam width at the steering point across the frequency range. This will, to some extent, reduce the SNR/gain of the overall array in order to preserve off-axis behavior without compromising any sound bleed back to the cabin. Thus, if the pilots move their heads away from where the steer point is, they won't perceive as drastic an amplitude variance.

Figure 7:
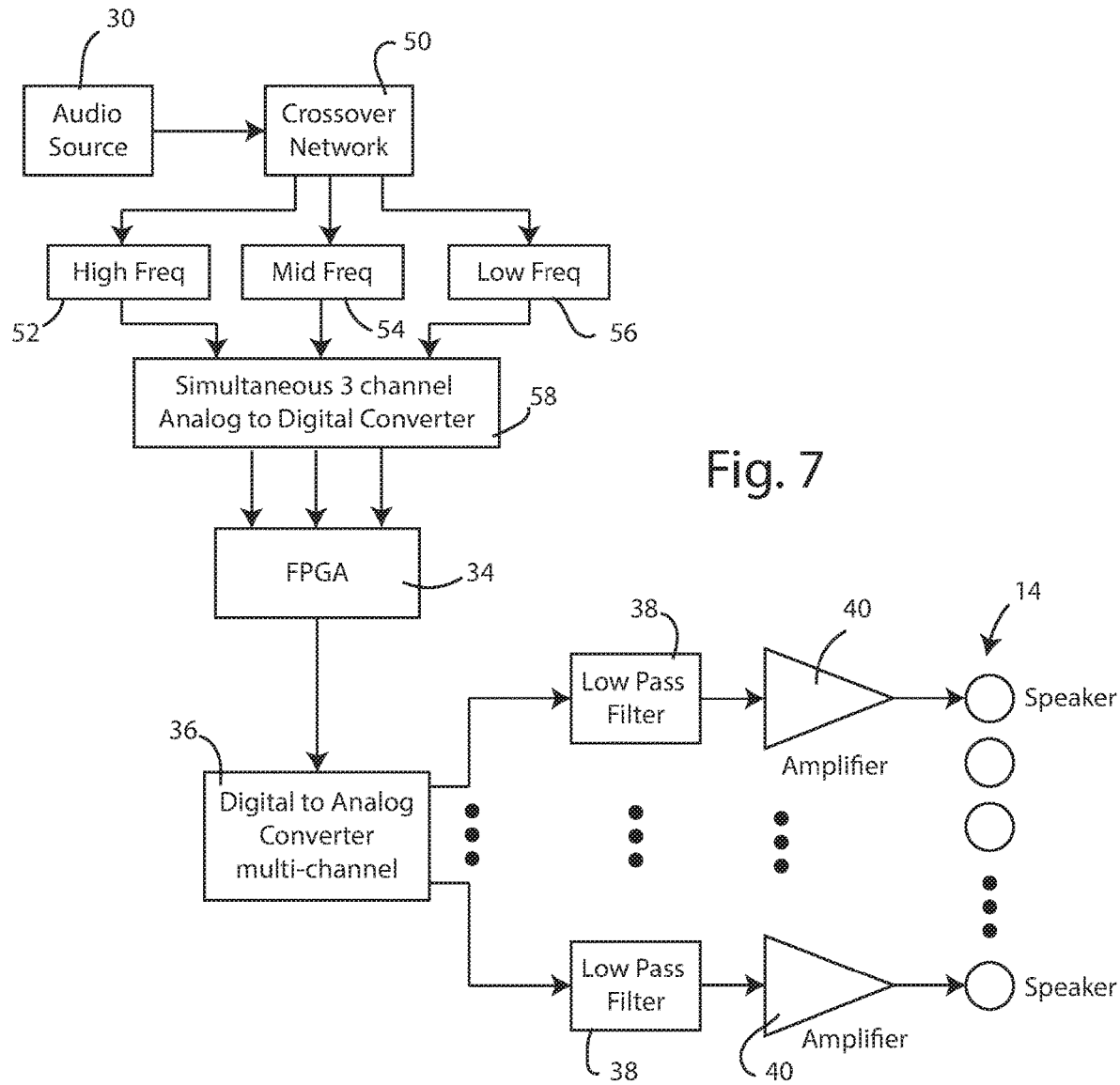
FIG. 7 is a circuit diagram of a multiple frequency band, signal processing circuit.

FIG. 7 illustrates another exemplary signal processing circuit 18 embodiment that may be used to process the audio content that is subdivided into frequency bands, such as high, mid and low frequency bands. This multi-band embodiment is well suited for speaker arrays that have been optimized in clusters, to favor different frequency ranges, such as the concentric array (FIG. 2D) and spiral array (FIG. 2E). In this embodiment the audio source 30 is split on the basis of frequency by crossover network 50 into plural frequency bands. For illustration, three frequency bands or channels have been illustrated (high channel 52, mid channel 54, low channel 56). A greater or fewer number of bands may be implemented as required by the application.

Subdividing the audio spectrum into different frequency ranges or bands provides better control over how sounds at different frequencies may be delivered at a particular position in space with pinpoint accuracy. The reason for this is that the time delays needed to steer an acoustic beam to a particular point in space are frequency dependent (wavelength dependent). In the calculations discussed below, one finds that the wavelength of the acoustic wave plays a key role in the time delay calculation, and wavelength is inversely related to frequency as a matter of fundamental physics.

Thus, by subdividing the range of usable frequencies into different bands, it becomes possible for the FPGA 34 calculate appropriate time delays for each band or range of frequencies. By producing greater precision in focusing the acoustic energy, the multi-band embodiment is better able to deliver the full spectrum of broadcast sound directly to the pilot's ears. This accuracy also helps improve intelligibility because all frequency content required for good speech intelligibility is delivered without phase error. In this regard, the vowel sounds in human speech tend to be lower in the speech frequency range, while the consonant sounds tend to be higher in the speech frequency range. Speech signals are more intelligible if these respective vowel and consonant sounds arrive properly synchronized when they arrive at the human ear. Having highly accurate speech reproduction can be quite important in the aircraft cockpit to overcome the masking effect caused by the high ambient noise levels during flight.

The high, mid and low channels 52-56 are converted simultaneously into digital audio streams by the simultaneous multi-channel ADC 58. It is important that these channels are simultaneously digitized so that the digitization process does not introduce any time discrepancies among the multiple channels. The reason for this was discussed above—to ensure phase coherence among the frequency bands so that beam focus is accurate and speech intelligibility is not degraded.

The multiple bands (in this case high, mid, low) of digital audio are then processed by FPGA 34, essentially as discussed above, to produce individual time delayed audio streams for each of the speakers 14 in the array. Thus, the post processing stages following the FPGA 34 include the DAC 36, the low pass filter bank 38, and the amplifier stage 40, which function essentially as discussed above.

When the concentric circular array (FIG. 2D) or spiral array (FIG. 2E) are employed, additional control over the sound delivery becomes possible. While all of the speakers in the concentric circular or spiral arrays can be driven as the linear array (without regard to frequency band) the concentric circular and spiral arrays are capable of better performance by feeding them with frequency in mind. For example, the speakers in the outermost orbit of the concentric circular array may be fed by lower frequencies while the speakers closer to the center of the array are fed by higher frequencies. In this way the array can have greater control over not only sound placement (where in space the signal is heard), but also sound fidelity (the richness of tonality heard at the placement location). Such frequency equalization (EQ) can also apply to the linear array. For example, the outer speakers in the linear array can be low-pass filtered, while the center ones can be high-pass filtered.

Individual speakers work by moving a mass of air through the pumping action of an electromagnetically driven piston or other movement producing device that is coupled to a speaker cone having a predefined surface area. Moving low frequencies (long wavelengths) requires movement of more air mass than is required for higher frequencies. This is why conventional bass frequency speakers usually have larger speaker cones than high frequency speakers.

A practical embodiment of a pilot communication system for an aircraft cockpit usually dictates use of smaller-sized speaker cones, because space is limited. While it is possible to implement a system using different sizes of speaker cones, such may not be practical or necessary to achieve good fidelity. One big advantage the system gets from the spatial separation with low frequencies is tied to the wavelength. Longer wavelengths need more separation between speakers to achieve directionality, which is important. However, as frequency increases, the larger spatial separation between speakers causes the increased peak/lull sideband behavior. This is where the crossover filtering comes into play and is why the inner speakers handle the higher frequencies. Thus, the relative distance between a grouping of speakers defines the wavelength (and conversely frequencies) at which they achieve acceptable directionality and sound field behavior.

Figure 8:
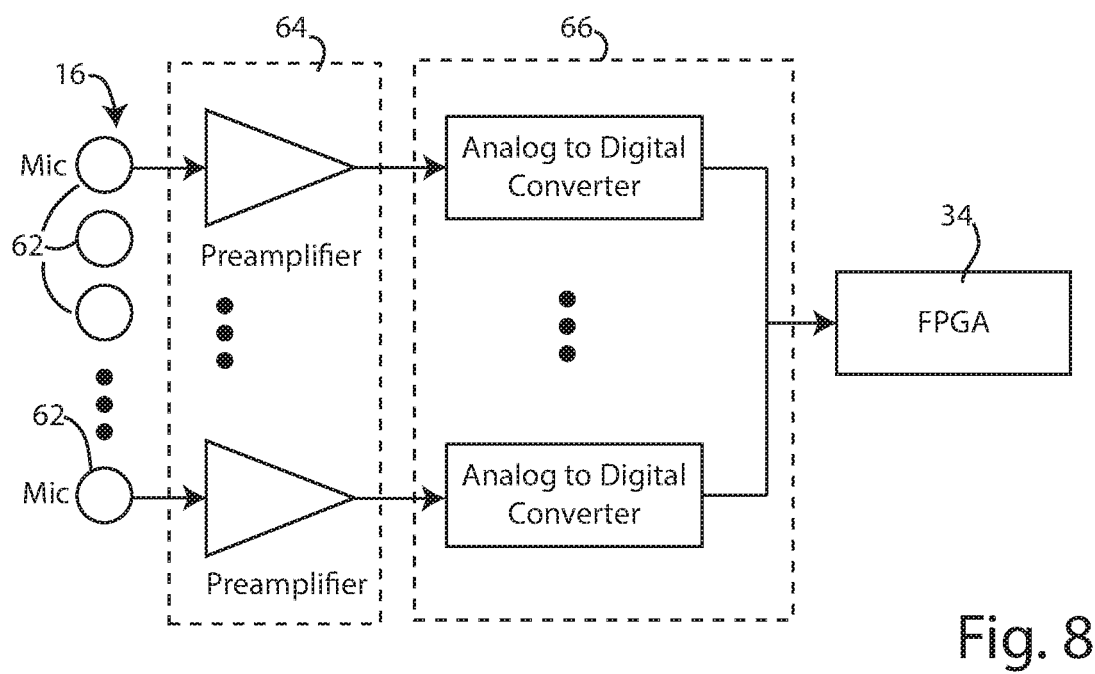
FIG. 8 is a circuit diagram illustrating the signal processing circuit interface to the microphone array.

Referring to FIG. 8, the processing of signals from the microphone array 16 is handled in a similar fashion. The individual microphones 62 are each fed to dedicated channels of microphone amplifier stage 64 and then fed to the simultaneous multi-channel ADC 66 which converts the microphone signals to digital signals. These digital signals are then input to the FPGA 34.

The FPGA controls the sample time of each microphone input relative to other microphone inputs, thereby electronically controlling the directivity of the overall sound received by the array of microphones. The received audio signal from the groups of microphones can then be digitally filtered, processed, and combined to create a customized highly directional received signal for each pilot while minimizing the noise from other sources or directions.

Calculation of Time Delays

The FPGA 34 calculates the applicable time delays using the same approach for the linear arrays, circular and spiral arrays—except that linear array delays are only computed in two (x,y) dimensions. The FPGA is supplied with the (x,y,z) coordinates of each speaker and microphone in space. Then within in the same (x,y,z) coordinate reference frame the FPGA is supplied with, or calculates, the steer point for both the microphone and speaker arrays. In a typical embodiment, the steer point for microphones and speakers would likely be in the direction of the pilot, but they could be different depending on the particular application. The FPGA then determines the distance from each speaker/microphone to the steer points and divides that distance by the speed of sound. This gives the time the sound waves will take to traverse the distance:

$$dt = \frac{\sqrt{x_{dist}^2 + y_{dist}^2 + z_{dist}^2}}{\text{speed of sound}}$$

The difference between the various travel times then amounts to the time delays (or time advances) applied to each signal by the FPGA. In one embodiment fixed location (s) may be used as the steer point (e.g., the nominal fixed locations of the pilots' heads. In another embodiment, the steer point is dynamically computed using image tracking. For example, image tracking may be performed by using optical or LiDAR sensing and recognition of the pilot's faces, heads, mouth, ears or the like. Other technology sensing technology may also be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. In an aircraft cockpit that defines an acoustic space with at least one pilot seating location disposed therein and that includes an avionics communication system, a pilot communication system comprising:

a transducer array comprising a plurality of individual acoustic transducers disposed in a spaced relation to one another and combined for deployment within the cockpit;

each of the plurality of acoustic transducers converting sound information between sound information expressed as an electrical signal and sound information expressed as an acoustic wave;

a signal processing circuit having an input port that receives sound information and an output port that supplies sound information after being processed by the signal processing circuit;

the input port being configured for coupling to one of: the transducer array and the avionics communication system;

the output port being configured to couple to the other of: the transducer array and the avionics communication system;

the signal processing circuit being coupled to the transducer array to electrically interface with each of the plurality of transducers individually;

the signal processing circuit selectively inserting a set of time delays associated with at least some of the plurality of individual transducers to form a coverage beam within the acoustic space of the cockpit;

the signal processing circuit selectively controlling the time delays associated with the at least some of the plurality of individual transducers to steer the coverage beam in the direction of the pilot seating location.

2. The pilot communication system of claim 1 wherein the transducer array comprises a plurality of individual speakers.

3. The pilot communication system of claim 1 wherein the transducer array comprises a plurality of individual microphones.

4. The pilot communication system of claim 1 wherein the input port that receives sound information in real time.

5. The pilot communication system of claim 1 wherein the input port and output port of the signal processing circuit both communicate electrical signals carrying sound information.

6. The pilot communication system of claim 1 wherein the port configured to couple to the transducer array communicates electrical signals in parallel to each of the plurality of individual acoustic transducers.

7. The pilot communication system of claim 1 wherein the signal processing system subdivides the sound information into a plurality of different frequency bands that are each separately and differently processed in selectively controlling the time delays associated with the at least some of the plurality of individual transducers.

8. The pilot communication system of claim 1 wherein the signal processing circuit focuses and steers the directivity of the coverage beam.

9. The pilot communication system of claim 1 wherein the signal processing circuit dynamically focuses and steers the directivity of the coverage beam by tracking the position of a pilot.

10. The pilot communication system of claim 1 wherein the signal processing circuit focuses the directivity of the coverage beam to reduce the audibility of flight deck alerts and warnings reaching a passenger cabin area within the aircraft.

11. The pilot communication system of claim 1 wherein the transducers are disposed in a substantially linear array.

12. The pilot communication system of claim 1 wherein the transducers are disposed in a substantially circular array.

13. The pilot communication system of claim 1 wherein the transducers are disposed in a spiral array.

14. The pilot communication system of claim 1 wherein the transducers are disposed in a locus of substantially concentric circles.

15. In an aircraft cockpit that defines an acoustic space with at least one pilot seating location disposed therein and that includes an avionics communication system, a pilot communication system comprising:

a microphone array comprising a plurality of individual microphones disposed in a spaced relation to one another and combined for deployment within the cockpit;

each of the plurality of microphones converting sound information expressed as an acoustic wave into sound information expressed as an electrical signal;

a speaker array comprising a plurality of individual speakers disposed in a spaced relation to one another and combined for deployment within the cockpit;

each of the plurality of speakers converting sound information expressed as an electrical signal into sound information expressed as an acoustic wave;

a signal processing system having a first input port that receives sound information from the avionics communication system a second input port that receives sound information from the microphone array, the signal processing circuit being coupled to the microphone array to electrically interface with each of the plurality of microphones individually, the signal processing circuit selectively inserting a first set of time delays associated with at least some of the plurality of individual microphones to form a first coverage beam within the acoustic space of the cockpit;

the signal processing circuit having a first output port that supplies sound information to the avionics communication system and a second output port that supplies sound information to the speaker array, the signal processing circuit being coupled to the speaker array to electrically interface with each of the plurality of speakers individually, the signal processing circuit selectively inserting a second set of time delays associated with at least some of the plurality of individual speakers to form a second coverage beam within the acoustic space of the cockpit.

16. The pilot communication system of claim 15 further comprising:

the signal processing circuit selectively controlling the first and second time delays associated with the at least some of the plurality of individual transducers to steer the first and second coverage beams in towards different locations within the acoustic space of the cockpit.

17. The pilot communication system of claim 15 further comprising:

the signal processing circuit selectively controlling the first and second time delays associated with the at least some of the plurality of individual transducers to steer the first coverage beam in the direction of a first pilot seating location and to steer the second coverage beam in the direction of a second pilot seating location.

18. The pilot communication system of claim 15 wherein the microphones are disposed in a spaced apart array of spatial configuration selected from the group consisting of: linear, curvilinear, circular, concentric circular, square and spiral and combinations thereof.

19. The pilot communication system of claim 15 wherein the speakers are disposed in a spaced apart array of spatial configuration selected from the group consisting of: linear, curvilinear, circular, concentric circular, square and spiral and combinations thereof.

20. The pilot communication system of claim 15 wherein the plurality of microphones and the plurality of speakers are disposed in spatial configurations that differ from one another.

* * * * *